(12) United States Patent
Newsome et al.

(10) Patent No.: US 9,100,193 B2
(45) Date of Patent: Aug. 4, 2015

(54) METHOD FOR PROTECTING SENSOR DATA FROM MANIPULATION AND SENSOR TO THAT END

(75) Inventors: James Newsome, Pittsburgh, PA (US); Robert Szerwinski, Esslingen (DE); Jan Hayek, Munich (DE)

(73) Assignee: ROBERT BOSCH GMBH, Stuttgart (DE)

(*) Notice: Subject to any disclaimer, the term of this patent is extended or adjusted under 35 U.S.C. 154(b) by 437 days.

(21) Appl. No.: 13/498,954

(22) PCT Filed: Sep. 8, 2010

(86) PCT No.: PCT/EP2010/063168
§ 371 (c)(1),
(2), (4) Date: Aug. 9, 2012

(87) PCT Pub. No.: WO2011/039037
PCT Pub. Date: Apr. 7, 2011

(65) Prior Publication Data
US 2012/0303973 A1    Nov. 29, 2012

(30) Foreign Application Priority Data

Sep. 29, 2009  (DE) .......................... 10 2009 045 133

(51) Int. Cl.
*H04L 9/32* (2006.01)
*H04L 9/00* (2006.01)
(Continued)

(52) U.S. Cl.
CPC .............. *H04L 9/3271* (2013.01); *H04L 9/00* (2013.01); *H04L 9/12* (2013.01); *H04L 9/32* (2013.01);
(Continued)

(58) Field of Classification Search
CPC .................................. H04L 9/00; H04L 9/32
USPC .................................................. 713/189, 168
See application file for complete search history.

(56) References Cited

U.S. PATENT DOCUMENTS 8,341,701 B2    12/2012 Ayaki et al.
2007/0028115 A1    2/2007 Kober et al.
(Continued)

FOREIGN PATENT DOCUMENTS

CN    101116281    1/2008
DE    10 2009 002 396    10/2010
WO    WO 2007/088288    8/2007

OTHER PUBLICATIONS

FIPS 197, Advanced Encryption Standard (AES), Federal Information Processing Standards Publication 197, Nov. 2001, pp. 1-47.
(Continued)

*Primary Examiner* — Brandon Hoffman
*Assistant Examiner* — Samuel Ambaye
(74) *Attorney, Agent, or Firm* — Kenyon & Kenyon LLP

(57) ABSTRACT

In a method for protecting sensor data from manipulation, in the context of an authentication of the sensor, a number used once is sent from a control unit to the sensor, the sensor generating with the use of the number used once a cryptographic authentication message and sending at least a first part of the cryptographic authentication message to the control unit. In addition, the sensor data are provided with a cryptographic integrity protection, time-variant parameters being added to the sensor data and the sensor data being sent with the cryptographic integrity protection and the added time-variant parameters from the sensor to the control unit. For calculation of the initial parameters, at least a second part of the cryptographic authentication message is utilized.

15 Claims, 4 Drawing Sheets

(51) Int. Cl.
  *H04L 9/12* (2006.01)
  *H04L 29/08* (2006.01)
(52) U.S. Cl.
  CPC ............ *H04L 9/3242* (2013.01); *H04L 9/3297* (2013.01); *H04L 67/12* (2013.01); *H04L 2209/08* (2013.01); *H04L 2209/20* (2013.01); *H04L 2209/805* (2013.01)

(56) References Cited

U.S. PATENT DOCUMENTS

| | | | | |
|---|---|---|---|---|
| 2007/0245147 | A1* | 10/2007 | Okeya | 713/181 |
| 2008/0044014 | A1* | 2/2008 | Corndorf | 380/37 |
| 2008/0263647 | A1 | 10/2008 | Barnett et al. | |
| 2009/0089583 | A1* | 4/2009 | Patel | 713/171 |
| 2009/0138710 | A1 | 5/2009 | Minematsu | |

OTHER PUBLICATIONS

A. Bogdanov, L.R. Knudsen, G. Leander, C. Paar, A. Poschmann, M.J.B. Robshaw, Y. Seurin, and C. Vikkelsoe: Present: "An ultralightweight block cipher, in P. Pallier and I. Verbauwhede, editors, Proceedings of CHES 2007, vol. 4727 of Lecture Notes in Computer Science, pp. 450-466, Springer-Verlag, 2007."
"Bundesamt für Sicherheit in der Informationstechnik [German Federal Office for Security in Information Technology] BSI, AIS 20: Funktionalitatsklassen und Evaluationsmethodologie für deterministische Zufallszahlengeneratoren, Anwendungshinweise und Interpretationen zum Schema [Functionality Classes and Evaluation Methodology for Deterministic Random Number Generators, Application Notes and Interpretations regarding the Scheme] (AIS) Version 1, Feb. 12, 1999, BSI, 2001."
Bundesamt für Sicherheit in der Informationstechnik [German Federal Office for Security in Information Technology] BSI, AIS 31: Funktionalitatsklassen und Evaluationsmethodologie für physikalische Zufallszahlengeneratoren, Anwendungshinweise und Interpretationen zum Schema [Functionality Classes and Evaluation Methodology for Physical Random Number Generators, Application Notes and Interpretations regarding the Scheme] (AIS) Version 1, Sep. 25, 2001, BSI, 2001.
W. Killmann and W. Schindler: "Ein Vorschlag zu: Funktionalitätsklassen und Evaluations methodologie für physikalische Zufallszahlengeneratoren [A Proposal Regarding Functionality Classes and Evaluation Methodology for Physical Random Number Generators], Technical Paper on AIS 31, Version 3.1, Sep. 25, 2001, BSI, 2001."
Audrey Bogdanov and Christof Paar: "On the Security and Efficiency of Real-World Lightweight Authentication Protocols, in Secure Component and System Identification, Mar. 2007, Workshop Record of SECSI, Berlin, Mar. 17-18, 2008."
Walter Fumy and Hans-Peter Riess: "Kryptographie, Entwurf; Einsatz and Analyse symmetrischer Kryptoverfahren [Cryptographic Method]. R. Oldenbourg Verlag, Munich, Vienna, second edition, 1994."
"ISO/IEC 9798-2, Information technology—Security techniques—Entity Authentication—Part 2: Mechanisms using symmetric encipherment algorithms ISO/IEC, 1994."
Colin Boyd and Anish Mathuria, "Protocols for Authentication and Key Establishment, Springer, 2003, p. 31". The protocols specified in that literature may be found there as protocols 3.4 and 3.5, see pp. 77 and 78.
Jonathan Kahtz and Yehuda Lindell, "Introduction to Modern Cryptography, CRC Publishing, 2007, pp. 1-28".
Bart Preneel: MAC algorithms, in van Tilborg, for this, see "Henk C. A. van Tilborg, editor, Encyclopedia of Cryptography and Security, Springer, 2005, pp. 365-368"
Mihir Bellare, Ran Canetti and Hugo Krawczyk: "Keying hash functions for message authentication, in Neal Koblitz, editor, Proceedings of CRYPTO '96, vol. 1109 of Lecture Notes in Computer Science, pp. 1-15, Springer, 1996."
A.J. Menezes, P.C. van Oorschot, and S.A. Vanstone, "Handbook of Applied Cryptography, CRC Press, 1996, Algorithm 9.29, p. 334".
A.J. Menezes, P.C. van Oorschot, and S.A. Vanstone, "Handbook of Applied Cryptography," CRC Press, 1996, Algorithm 9.30, pp. 334-335.
ISO/IEC 9797-1, Information technology—Security techniques—Message Authentication Codes (MACs) Part 1: Mechanisms using a block cipher, ISO/IEC, 1999 of the Standard for Message Authentication Codes.
Appendix A of the standard "ISO/IPC 9797, Information technology—Security techniques—Data integrity mechanisms using a cryptographic check function employing block cipher algorithm, ISO/IEC, 1994."
ISO/IEC 9797-1, Information technology—Security techniques—Message Authentication Codes (MACs) Part 1: Mechanisms using a block cipher, ISO/IEC, 1999.
M. Bellare, J. Kilian and F. Rogaway, "The security of cipher block chaining, Journal of Computer and System Sciences, 3(61):362-399, 2000".
E. Petrank and C. Rackoff: "CBC MAC for real-time data sources, Journal of Cryptology, 3(13):315-38, 2000, pp. 315-318."
J. Black and P. Rogaway, "CBC MACs for arbitrary-length messages," in Mihir Bellare, editor, Advances in Cryptology-CRYPTO 2000, No. 1880 in Lecture Notes in Computer Science, pp. 197-215, Springer-Verlag, 2000.
T. Schütze, "Algorithmen für eine Crypto-Library für Embedded Systems [Algorithms for a Crypto-Library for Embedded Systems], Technical report, Robert Bosch GmbH, CR/AEA, Aug. 2007, internal document, version 1.0, Aug. 7, 2007, 46 pages".
T. Iwata and K. Kurosawa: OMAC: "One key CBC MAC, in T. Johannson, editor, Fast Software Encryption, No. 2887 in Lecture Notes in Computer Science, pp. 129-153, Springer-Verlag, 2003."
Morris Dworkin: "Cipher Modes of Operation: The CMAC Mode for Authentication, NIST Special Publication 800-38b, National Institute of Standards and Technology NIST, May 2005," pp. 1-19.
Jonathan Kahtz and Yehuda Lindell: "Introduction to Modern Cryptography, CRC Publishing, 2007," pp. 111-158.
"ISO/IEC 9797-2, Information technology—Security techniques—Message Authentication Codes MACs—Part 2: Mechanisms using a dedicated hash function, ISO/IEC; 2002".
A.J. Menezes, P.C. van Oorschot and S.A. Vanstone: "Handbook of Applied Cryptography, CRC Press, 1996, Table 9.10, p. 362."
H. Cam et al.: "Energy efficient security protocol for wireless sensor networks," Vehicular Technology Conference, 2003. VTC 2003-Fall. 2003 IEEE 58th Orlando, FL, USA Oct. 6-9, 2003; [IEEE Vehicular Technology Conference], Piscataway, NJ, USA, IEEE, US, vol. 5, Oct. 6, 2003, pp. 2981-2984.
M. Bohge, W. Trappe: "An authentication framework for hierarchical ad hoc sensor networks," Wise '03 Proceedings of the $2^{nd}$ ACM Workshop on Wireless Security, Sep. 19, 2003, pp. 79-87.

\* cited by examiner

METHOD FOR PROTECTING SENSOR DATA FROM MANIPULATION AND SENSOR TO THAT END

BACKGROUND OF THE INVENTION

1. Field of the Invention

The present invention relates to a method for protecting sensor data from manipulation and to a sensor to that end.

2. Description of Related Art

German patent application document DE 102009002396 (which is not deemed a prior art) of the Applicant describes a method for protecting sensor data from manipulation, which method is distinguished by the fact that, by linking authentication of the sensor and integrity protection of sensor data, a transaction authentication is achieved, thereby guaranteeing greatly enhanced protection against manipulation of the sensor data.

BRIEF SUMMARY OF THE INVENTION

The method according to the present invention and the sensor according to the present invention make it possible to achieve a transaction authentication of sensor data in which protection from manipulation is not undermined even if a key is lost, for example as a result of side channel attacks. Thus, with minimal additional expenditure, an even more robust manipulation protection for sensor data is obtained.

In one advantageous embodiment, the time-variant parameters are altered in each step of the transaction authentication. That procedure corresponds to a sequence counter, and permits an especially tight cryptographic coupling of the method parts authentication and transaction authentication, and hence a further gain in security. It is especially advantageous, because especially simple to implement, if the alteration of the time-variant parameters corresponds to a stepwise incrementation.

One special embodiment is based on the fact that a first part of the cryptographic authentication message, which is generated in the course of the authentication procedure from the authentication message by truncation and which is transmitted by the sensor to the control unit, and the second part of the cryptographic authentication message, which is used for calculating the time-variant parameters, do not overlap.

It is especially advantageous if the time-variant parameters are calculated in each step of the transaction authentication from a difference between initial parameters, obtained from the cryptographic authentication message, and current parameters, the current parameters being derived from the initial parameters by stepwise incrementation. In that manner, in addition to the previous advantages, a possible response truncation arising from the authentication procedure is also not weakened.

In a preferred exemplary embodiment, a challenge-response method is used as the authentication method, which is distinguished by a particularly high level of security. Also advantageous is a use of MAC methods for protecting the integrity of sensor data, which methods likewise meet high security standards, the extremely secure EMAC and OMAC methods being particularly expedient.

In special forms of embodiment, the time-variant parameters are in the form of time stamps, sequence counters or random numbers. Those embodiments bring with them, above all, the advantage of an especially simple, yet expedient implementation of the method according to the present invention.

DETAILED DESCRIPTION OF THE INVENTION

Figure 1:
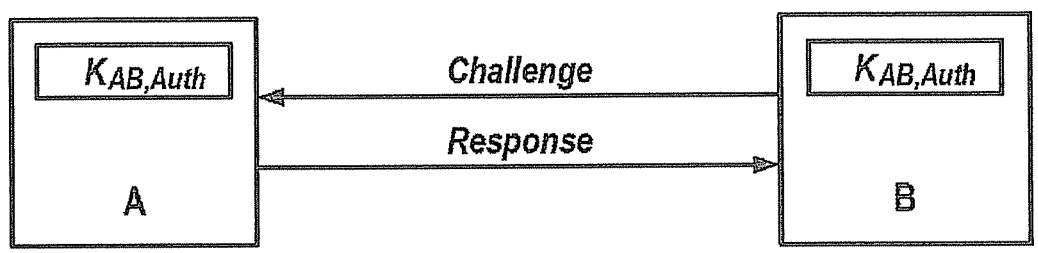
FIG. 1 shows a schematic representation of a system for authenticating a sensor A at a control unit B using a challenge-response method

Hereinafter, where expedient, the example of an RP sensor and a control unit in a motor vehicle will be used for the purpose of describing the present invention. This does not, however, constitute any limitation of the present invention to that example, since the overall security concept described is conceived in general for assuring the security of communication between any control unit and a sensor.

When considering the requirements for safeguarding communication channels, principally the following aspects need to be considered:

(1) [message authentication] protection of the integrity of the data (2) [entity authentication] making sure of the authenticity of the source (3) [confidentiality] protection of the confidentiality of data (optional)

In addition to those basic requirements, further requirements are derived which render difficult or prevent specific types of attack that are not explicitly covered by the basic requirements, but which by their nature are implicitly assumed. The following inter alia are to be mentioned here:

(a) [replay protection] protection against replaying of data that although having integrity (1) have already been sent once.

(b) [liveness] making sure that the source was "alive" at the time of transmission, i.e., that no data previously calculated (or recorded and not sent) at an earlier time were used.

Hereinafter it will be assumed that the data are not confidential, and therefore (3) is not required. This may be the case, for example, with sensors in the automotive sector. German patent application document DE 102009002396 of the Applicant contained protocols for achieving (1), (2) together with (a) and (b) taking into consideration the limited resources (computation time, channel capacity). The basic idea here is the use of message authentication codes (MACs) for integrity protection, the use of a challenge-response protocol based on symmetric cryptography for source authentication, and combination of those two parts in order to achieve transaction protection. Both individual protocols have their own respective symmetric key ($K_{mac}$ and $K_{auth}$, respectively).

The method for transaction authentication according to the present invention is described in detail hereinafter with reference to an exemplary embodiment. Whereas steps 1-3 of the security concept which are presented first are largely known from German patent application document DE 102009002396, the important differences arise in the decisive fourth step of the security concept of the present invention, which step is explained inter alia with reference to FIG. 6 and is based on a linking of method steps.

In order to obtain a firm link between authentication and integrity protection, it is proposed that the random numbers of both steps, or as explained below the time-variant parameters and the random numbers, or nonces (numbers only used once) of the two steps, be combined. As a result of that combination of the two part-steps authentication and integrity protection, a tight cryptographic coupling of the two parts is achieved while at the same time also saving on the implementation of a random number generator on the sensor side. Furthermore, by using the method and sensor proposed herein, manipulation protection is not breached even if one of the keys is lost, for example as a result of a side channel attack.

FIG. 1 shows a schematic representation of a system for authenticating a sensor A at a control unit B using a challenge-response method. In that method, control unit B sends a challenge to sensor A which, for authentication purposes, answers with a response. Indicated schematically here is a concrete method forming part of an overall security concept that meets high security requirements and that reliably recognizes cryptographically any attacks of the types mentioned above and also further security threats and violations.

A first step involves a challenge-response method for authentication of the RP sensor at the control unit ECU. The objective of the authentication is to establish whether, at the time of the authentication, the RPS has a valid authentication feature, that is, knowledge of a cryptographic key, and to firmly link that feature to its identity, for example a serial number (main points: freshness, liveness of key).

Figure 2:
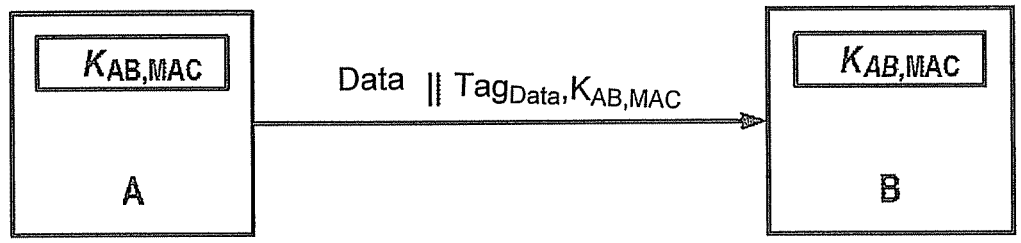
FIG. 2 shows a schematic representation of a system for protecting the integrity of sensor data.

FIG. 2 shows a schematic representation of a system for integrity protection of the sensor data. In this second step of the security concept, after the authentication—that is, the receiver of the data, namely the control unit (ECU) B, knows that it is communicating with an authenticated transmitter, namely RP sensor A—, the transmitted data are continually provided with an integrity protection, preferably with time-variant parameters such as random numbers, sequence numbers (sequence counters) or time stamps. This is represented in FIG. 2 by appending a tag to the data transmitted from sensor A to control unit B, the tag representing the time-variant parameters. After processing of the pressure data, those time-variant parameters are checked cryptographically, and a manipulation of the RPS data is reliably recognized cryptographically, that is, no additional latency times occur in the real-time data processing as a result of the cryptography and manipulations may therefore be detected.

As an efficient method for achieving cryptographic integrity protection, so-called authentication codes MACs are proposed. In the case of so-called CBC MAC methods, two further cryptographic keys are used, and, in a further, modified proposal, the so-called OMAC, even only one additional integrity key suffices. Specifically proposed as a realization option for the RP sensor having the digital PSI5 interface are: EMAC and CMAC, also known as OMAC. Both methods use a symmetric block cipher; proposed are either the AES-128, see "FIPS 197, Advanced Encryption Standard (AES), Federal Information Processing Standards Publication 197, November 2001, http://csrc.nist.gov/", key length k=128 bits, block width n=128 bits, or alternatively PRESENT, see "A. Bogdanov, L. R. Knudsen, G. Leander, C. Paar, A. Poschmann, M. J. B. Robshaw, Y. Seurin, and C. Vikkelsoe, PRESENT: An ultra-lightweight block cipher, in P. Pallier and I. Verbauwhede, editors, Proceedings of CHES 2007, volume 4727 of Lecture Notes in Computer Science, pages 450-467, Springer-Verlag, 2007", key length k=128, block width n=64. PRESENT is still a relatively new block cipher and it is much less fully developed than AES; meanwhile, there are also first reports on theoretical cryptanalysis attacks.

In a third step of the security concept, in order to prevent so-called replay attacks, in addition to the useful data, that is, pressure values, random numbers are inserted into the data to be safeguarded by integrity protection. Those random numbers are transmitted in plaintext to the ECU and are verified with the aid of MAC.

The authentication should be carried out promptly after an engine start, that is, in the first minutes. It is not, however, necessary for it to be performed directly in the startup phase. The integrity protection does not take place until after the authentication; before that, this integrity protection makes no sense cryptographically. Whereas the authentication takes place relatively seldom, at least after each engine start and after loss of several packets or of synchronism, the pressure data are continually provided with an integrity tag, that is, for example, every t=16 blocks. The random number transmitted during the authentication from ECU to sensor may be used as a sequence counter to link the method steps, for example as a component in the integrity protection, and may be incremented with each (t=16)×(n=128)-bit block.

If the integrity protection is used as standard in each pressure packet, then prior to the authentication either the MAC data should be ignored, which is unfavorable, or should be used with the random numbers available on the RP sensor. Once authentication has taken place, the negotiated sequence counter is used.

The cryptographic security objectives of authenticity of the sender and of the data, integrity of the data and also freshness of the cryptographic keys and data, and prevention of replay attacks are achieved with the aid of the following mechanisms:

authentication by challenge-response method (encryption of a challenge together with identity); integrity protection by message authentication codes based on the CBC mode together with suitable padding and MAC-strengthening, that is to say, EMAC and CMAC; prevention of replay attacks by insertion of random numbers together with the pure useful data; secure cryptographic linking of the two protocol parts by using one part of the challenge as a sequence counter for the integrity protection; for all mechanisms, only a single basic element, a symmetric block cipher, is needed—as a realization option, AES-128 or, alternatively, PRESENT are specifically proposed; furthermore, because of the linking of the two protocol parts, a random number generator is needed only on the control unit.

Let A be the RP sensor and B the control unit ECU. The objective is the authentication of A with respect to B, that is, A proves to B that it has a shared secret, a cryptographic key, at the time of the authentication. Both participants in the protocol possess three shared keys:

$K_{AB,Auth}$—shared authentication key
$K_{AB,MAC1}$—shared message authentication code key 1
$K_{AB,MAC2}$—shared message authentication code key 2

In the case of the CMAC algorithm, one shared message authentication code key 1, $K_{AB,MAC1}$, is sufficient. Let $Enc_K$ be an encryption algorithm with key K of length k and block width n, for instance $Enc_K$=AES, k=length(K)=128, n=128. Alternatively, $Enc_K$=PRESENT, k=length(K)=128, n=64, for example, would come into consideration. Furthermore, let $ID_A$ and $ID_B$ be system-wide unique identities of the users, for example 32-bit-long serial numbers or type part numbers. The length of the serial numbers is not cryptographically significant. What is important is that all users in the entire system, i.e., not only an engine/vehicle, may be clearly identified. This plays a central role in key management, as described later.

In addition, in this example, let $R_A$ and $R_B$ be random numbers generated by A and B, respectively, whose suitable length will be specified later.

Figure 3:
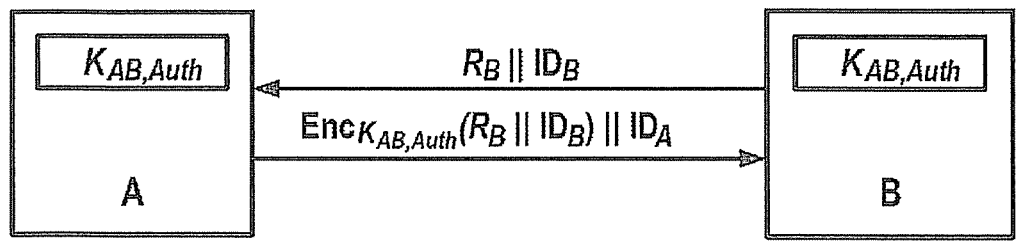
FIG. 3 shows a schematic representation of a system for authenticating a sensor A at a control unit B.

An example of an authentication of sensor A with respect to control unit B is described below in accordance with German patent application document DE 102009002396. Steps 1-3 are illustrated schematically in FIG. 3.

1. B generates a 64-bit random number $R_B$
2. B transmits that random number $R_B$ together with its identity $ID_B$ to A:
   B→A: $R_B \| ID_B$ (64 bit∥32 bit)
3. A encrypts the message $R_B \| ID_B$, that is, $Enc_{K_{AB,Auth}}(R_B \| ID_B)$ and sends it, together with $ID_A$, back to B:
   A→B: $Enc_{K_{AB,Auth}}(R_B \| ID_B) \| ID_A$ (128 bit∥132 bit)
4. Immediately after completion of the protocol step in 2., B for its part is able to begin to calculate the response $y = Enc_{K_{AB,Auth}}(R_B \| ID_B)$. After receipt of response y' in 3., it compares y with transmitted response y':
   $y = y' = Enc_{K_{AB,Auth}}(R_B \| ID_B)$?
It further compares the identity of A with the desired identity, that is,
   $ID_A = ID'_A$?
Only if both comparisons are successful has A successfully authenticated itself with respect to B.

In the following, an expedient modification of steps 3. and 4. is described. To save on communication bandwidth, only the most significant 64 bits of the encryption are transmitted in step 3, and consequently also compared in step 4. This is not synonymous with the use of an encryption method having a 64-bit block width, 3'. A→B: $msb_{127,\ldots,64}[Enc_{K_{AB,Auth}}(R_B \| ID_B)] \| ID_A$ (64 bit∥32 bit)

In the following, the entire method for authentication 1 is described.

1. B generates a 64-bit random number $R_B$
2. B transmits that random number $R_B$ together with its identity $ID_B$ to A:
   B→A: $R_B \| ID_B$ (64 bit∥32 bit)
3. A encrypts the message $R_B \| ID_B$, i.e., $Enc_{K_{AB,Auth}}(R_B \| ID_B)$, and sends the 64 most significant bits, together with $ID_A$, back to B
   A→B: $msb_{127,\ldots,64}[Enc_{K_{AB,Auth}}(R_B \| ID_B)] \| ID_A$ (64 bit∥32 bit)
4. Immediately after completion of the protocol step in 2., B for its part is able to begin to calculate the response $y = msb_{127,\ldots,64}[Enc_{K_{AB,Auth}}(R_B \| ID_B)]$. After receipt of response y' in 3., it compares y with transmitted response y':
   $y = y' = msb_{127,\ldots,64}[Enc_{K_{AB,Auth}}(R_B \| ID_B)]$?
It further compares the identity of A with the desired identity, that is,
   $ID_A = ID'_A$?
Only if both comparisons are successful has A successfully authenticated itself with respect to B.

In this regard, the following should be noted.

(i) The step of the security concept proposed here is essentially the ISO/IEC 9798-2 two-pass unilateral authentication protocol. For this, see "ISO/IEC 9798-2, Information technology—Security techniques—Entity Authentication—Part 2: Mechanisms using symmetric encipherment algorithms ISO/IEC, 1994". This applies except for the modification of the transmission of only the 64 most significant bits of Enc.

(ii) To prevent replay attacks, that is, recording of the entire traffic and replay in later protocol sequences, the random number $R_B$ is used in the protocol. Cryptographically, it must be a "nonce" (=number used only once). In the application scenario under consideration, a length of 64 bits is regarded as sufficient to prevent replay attacks in the authentication. In the past, shorter time-variant parameters, for example WEP encryption in the case of WLAN 802.11b, KeeLoq, already resulted in attacks and/or exploitable weaknesses of the method. Further remarks concerning the necessity of the authentication and alternative possibilities are to be found hereinafter. For generating the random numbers in control unit B, a random number generator RNG is needed. In the case of deterministic RNGs, the random number generator should have the property K3 high. For this, see "Bundesamt für Sicherheit in der Informationstechnik [German Federal Office for Security in Information Technology] BSI, AIS 20: Funktionalitätsklassen und Evaluationsmethodologie für deterministische Zufallszahlengeneratoren, Anwendungshinweise und Interpretationen zum Schema [Functionality Classes and Evaluation Methodology for Deterministic Random Number Generators, Application Notes and Interpretations regarding the Scheme] (AIS) Version 1, 2.12.1999, BSI, 2001", available at "http://www.bsi.bund.de/zertifiz/zert/interpr/ais20.pdf".

At least it should have the property P1 high in the case of physical RNGs, and better still P2 high. For this, see "Bundesamt für Sicherheit in der Informationstechnik [German Federal Office for Security in Information Technology] BSI, AIS 31: Funktionalitätsklassen und Evaluationsmethodologie für physikalische Zufallszahlengeneratoren, Anwendungshinweise und Interpretationen zum Schema [Functionality Classes and Evaluation Methodology for Physical Random Number Generators, Application Notes and Interpretations regarding the Scheme] (AIS) Version 1, 25.9.2001, BSI, 2001", available at "http://www.bsi.bund.de/zertifiz/zert/interpr/ais3i.pdf". See also in this connection "W. Killmann and W. Schindler, Ein Vorschlag zu: Funktionalitätsklassen und Evaluationsmethodologie für physikalische Zufallszahlengeneratoren [A Proposal Regarding Functionality Classes and Evaluation Methodology for Physical Random Number Generators], Technical Paper on AIS 31, Version 3.1, 25.9.2001, BSI, 2001", available at "http://www.bsi.bund.de/zertifiz/zert/interpr/trngkr31.pdf".

(iii) The selection by way of example of $|R_B|=64$ results in an attack complexity of $2^{33}=2^{64/2+1}$ communication sessions with simultaneous storage of $2^{64/2} \times 2^{32}$ pairs $(R_B \| msb_{127\ldots 0} Enc_K(R_B))$ (64 bit∥64 bit) for a simple two-step dictionary attack. For this, see, for example, "Audrey Bogdanov and Christof Paar, On the Security and Efficiency of Real-World Lightweight Authentication Protocols, in Secure Component and System Identification, March 2007, Workshop Record of SECSI, Berlin, Mar. 17-18, 2008". It should be noted that in the RP sensor application scenario, the communication to the transmitter (challenge) is slower by orders of magnitude than the communication from the transmitter to the control unit (response). Simple guessing of the 64-bit response $msb_{127\ldots 0} Enc_K(R_B)$ has an attack complexity of $2^{64-1}=2^{63}$. The identities $ID_A$, $ID_B$ are needed in the system, since later it is also planned to use more sensors. They are assumed to be, for example, 32-bit values, but without any relatively great problems may also be 64 bits long. Should the data packets $R_B \| ID_B$ become longer than 128 bits, for example owing to selection of an 80-bit ID, it should be noted that then a secure mode of operation is used for $Enc_K(R_B \| ID_B)$, for example CBC encryption with random IV and padding, and no longer the simple ECB mode, that is to say, the solution is feasible in principle, but is more costly.

A better value for the length of the challenge from the point of view of cryptography would be, for example, $|R_B|=128$.

Then, both a scan attack (guessing of the response) and dictionary attacks would have an attack complexity of approximately $2^{64}$. The message blocks would then admittedly have exceeded the limit of 128 bits, but shorter identifiers ID are not possible.

(iv) The proposed method effectively prevents so-called "reflection attacks", sometimes also called "impersonation" or "parallel sessions attack". The simplified protocol:

2. B→A: $R_B$ (64 bit)

Figure 4:
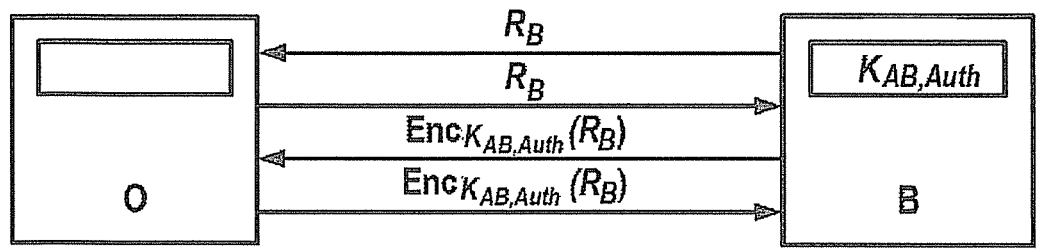
FIG. 4 shows a schematic representation to explain a reflection attack in the case of simple authentication.

3. A→B: $\text{Enc}_{K_{AB,Auth}}(R_B)$ (128 bit), that is, without identities ID, are capable of being attacked by random number $R_B$ being immediately reflected and sent back to B by attacker O. B responds to this parallel second session with the calculated value $\text{Enc}_{K_{AB,Auth}}(R_B)$ which O in turn uses as the response. FIG. 4 shows a schematic representation of such a reflection attack in the case of simple authentication.

A simple countermeasure, without additional implicit assumption regarding the behavior of A and B, is the inclusion of the identity in the text to be encrypted, that is, $\text{Enc}_{K_{AB,Auth}}(R_B \| ID_B)$ (v) Instead of the encryption function Enc, it is also possible for a keyed hash function HMAC, a general hash function, such as SHA-256, or a message authentication code (MAC), such as CBC MAC, to be used in the protocol. However, those realization options would all lead to higher expenditure.

(vi) The authentication of the challenge, that is, B→A: $R_B$, MAC ($R_B$) is dispensed with in this exemplary embodiment for reasons of economy and in consideration of the remarks made in (iii).

(vii) The protocol proposed here by way of example is a so-called "two-pass unilateral authentication protocol with nonces". In cryptography, a protocol having the fewest number of protocol passes and, nevertheless, high security properties is always sought. In general, it may be said that one will usually manage with one protocol pass fewer if, instead of using nonces, random numbers, one uses either a time stamp or a synchronous counter, sequence number (sequence counter/sequence number). In particular, the time stamp or the counter must not be set or reset by A, the prover. In that case, all protocol actions would come from A and could therefore be recorded.

The decisive point, therefore, is: if only a unidirectional communication is able to take place from A to B, and neither time stamps nor sequence counters, which must be present in the system synchronously and in a non-manipulable form, may be used, then all protocol actions are initiated by A, B is passive, and the prover/claimant A is able theoretically to previously record and play all data. Thus, in principle, it is not possible to dispense with the back-channel and nevertheless achieve the required security, for example by implicit authentication.

In this regard, reference is made to "Walter Fumy and Hans-Peter Riess, Kryptographie, Entwurf; Einsatz and Analyse symmetrischer Kryptoverfahren [Cryptography, Outline; Use and Analysis of Symmetric Cryptographic Methods], R. Oldenbourg Verlag, Munich, Vienna, second edition, 1994". It is taught therein that the use of time stamps requires the availability of a sufficiently exact and reliable system time. In this case, the verifying entity is able to check the validity of a message on the basis of the associated time stamp. A message is accepted if the deviation between the time of receipt of the message and the time stamp does not exceed a threshold value. If a replaying of transactions within the tolerated time interval is also to be prevented, then a correspondingly long record of the accepted messages must be kept. However, in the context of sensors, this is impossible. A certain difficulty in the practical use of time stamps is the synchronization of the clocks at the entities involved; but their frequently inadequate security against manipulation may also be problematic. The basic idea of sequence numbers is that, in an authentication mechanism, for each sequence number only one message or one message within a specific logical time period is accepted. The use of sequence numbers requires a certain amount of expenditure in terms of administration, which is incurred for every corresponding communication relationship. A minimum requirement is the storage of the respectively current sequence number for each direction of communication. Synchronization mechanisms must also be provided, for example, for the event of a system failure.

By reference to that excerpt from a cryptography textbook it will be seen that it is not possible to dispense with some form of bidirectional or synchronous communication in an authentication procedure. For the exemplary embodiment of a sensor—control unit communication via a PSI5 bus, this means that the question whether it is possible to dispense with a synchronous, bidirectional PSI5 communication between ECU and sensor is clearly to be answered in the negative.

(viii) For the sake of completeness, the corresponding "one-pass unilateral authentication protocol with time stamps/sequence counters" in accordance with ISO/IEC 9798-2 is also mentioned. For this, see "ISO/IEC 9798-2, Information technology—Security techniques—Entity Authentication—Part 2: Mechanisms using symmetric encipherment algorithms ISO/IEC, 1994".

A→B : $\text{EnC}_{K_{AB,Auth}}(TS_A \| ID_B) \| ID_A$ where $TS_A$—time stamp, generated by A. The $ID_A$ transmitted in plaintext is of no direct cryptographic significance, they are not in the ISO standard.

There follows a discussion of design principles for cryptographic protocols. For designing a cryptographic protocol there are a number of principles that should be observed. In this regard, reference is made to "Colin Boyd and Anish Mathuria, Protocols for Authentication and Key Establishment, Springer, 2003, Page 31".

The protocols specified in that literature may be found there as protocols 3.4 and 3.5, see pages 77 and 78; the symbol $\{\ \}_K$ stands for authenticated encryption with key K.

A→B: $\{T_A, B\}_{K_{AB}}$

Protocol 3.4: ISO/IEC 9798-2 one-pass unilateral authentication protocol 1. B→A: $N_B$

2. A→B: $\{N_A, B\}K_{AB}$

Protocol 3.4: ISO/IEC 9798-2 two-pass unilateral authentication protocol

It may be gathered from Table 3.2 to be found in the literature on page 80 that both protocols 3.4 and 3.5 fulfill the desired properties of liveness, freshness of key, and entity authentication of A, and that no known attacks exist, although no formal security proof exists. The security of both protocols was studied on a broad basis in the past. Formal security proofs of protocols have only recently become a rigorous demand made on standards. For technical reasons, the resulting protocols are often somewhat more extensive than the classic authentication protocols. The protocol selected by way of example in the following, based on protocol 3.5, is the most favorable of all the protocols presented there for which no attack exists as yet.

In the following, the integrity protection of the sensor data, the second step of the overall security concept, is discussed in greater detail. In addition to the prevention of the substitution of sensors, the prevention or, more precisely, the discovery and proof/evidence of modifications of the sensor data are of very great importance. Cryptographic techniques for the protection of data focus on the origin of the data, that is, on data origin authentication, integrity of sender, and on the integrity of the data, that is, the fact that the data were not modified. Other important aspects are the timeliness, the sequence of data and, where applicable, the intended recipient. Those properties are greatly dependent on the application. For example, the question arises whether the replay of unmodified data, for example in the case of packet losses, is a cryptographic attack. Therefore, no time-dependent states are incorporated into the basic cryptographic mechanisms themselves.

The terms given above are used in the following. Thus, let $x=(x_1, \ldots, x_t)$ be the t message text blocks of block width n, where applicable after padding has been carried out. To achieve the objective of authenticity and integrity of the data, a distinction may be made essentially between three cryptographic approaches: authentication codes, digital signatures and message authentication codes.

Authentication codes are combinatory objects whose probability of success for an attack may be explicitly calculated and is independent of the computing power of the attacker. They are relatively uncommon nowadays; often a new key is needed for each transaction.

Digital signatures are asymmetric methods, which are slower than symmetric methods by a factor of 100 to 1000. In the case of asymmetric methods, each sensor/user A has its own key pair $pk_A$, $sk_A$ (public key, secret/private key). In the signature, user A hashes message x and applies the signature generation method GenSig with its private key $sk_A$, and sends the resulting signature s to B, i.e., A→B: x, s=GenSig$_{skA}$ (h(x))

B: VerSig$_{pkA}$ (x', s) valid? Accept or Reject.

B receives message x' and signature s and checks the signature with the aid of the signature verification method VerSig, using the authentic public key of A. Nowadays, mostly RSA PKCS#1 v1.5 signatures are used, for example, in the automotive sector:

1. RSA 1024 bit: GenSig: 1024 bit$^{1024\ bit}$, VerSig: 1024 bit$^{16\ bit}$; signature, module, private key per 128 bytes, public key 16 bit 2. RSA 2048 bit: GenSig: 2048 bit$^{2048\ bit}$, VerSig: 2048 bit$^{16\ bit}$; signature, module, private key per 256 bytes, public key≈16 bit ECC (Elliptic Curve Cryptography) signatures have considerably better properties.

3. ECDSA 160 bit—security comparable to RSA 1024 bit: GenSig: one scalar point multiplication, VerSig: two scalar point multiplications; signature 40 bytes 4. ECDSA 256 bit—security comparable to RSA 2048 bit: GenSig: one scalar point multiplication, VerSig: two scalar point multiplications; signature 80 bytes In addition to providing integrity protection, digital signatures provide the property of non-repudiation, which may be helpful in law in the event of disputes between the communication partners. Since, in the sensor context described by way of example, both communication partners operate within the system of an automobile (engine or control unit B and sensor A) and control unit B will rarely repudiate a message received from sensor A, non-repudiation is not necessary in this specific case.

In the following, message authentication codes are explained. As considered in the foregoing, a simple encryption of a tag, for example linear tag or hash digest, does not solve the problem of the authenticity of messages. A message authentication code is made up of a:

1. key-generation algorithm: output: symmetric key K, bit length k, for example k=56 . . . 256, 2. MAC-generation algorithm: input: text x, key K, output: $MAC_K(X)$—bit string of length m, for example m=24 . . . 128, 3. MAC-verification algorithm: input: text x, MAC-value $MAC_K(X)$, key K, output: accept or reject.

The security of a MAC algorithm may be described informally as follows—generally accepted security model: it should be practically impossible, computationally infeasible, for an attacker to generate a so-called existential forgery, that is, some kind of permissible falsification, using a so-called adaptive chosen text attack; this also includes, in particular, MAC-verification queries, see, for example, "Jonathan Kahtz and Yehuda Lindell, Introduction to Modern Cryptography, CRC Publishing, 2007, page 16". If a message authentication code is secure in this sense, then, in particular, the security is not dependent on the special encoding of the data.

Four typical attacks on MAC algorithms are:

1. Brute force key search→sufficiently large key space, for example k≥80 for medium-term security.

2. Guessing of the MAC value→probability of success max ($2^{-k}$, $2^{-m}$). For most applications, k>m and m=32 . . . 64 apply.

3. Generic falsification based on internal collisions. This is the case particularly with the modified proposed "integrity-protection methods" indicated above.

4. Attacks based on cryptanalytical weaknesses.

To clarify the latter two attack scenarios, the following is cited from: "Bart Preneel, MAC algorithms, in van Tilborg, for this, see "Henk C. A. van Tilborg, editor, Encyclopedia of Cryptography and Security, Springer, 2005, page 365".

A distinction is made between MACs based on block ciphers and MACs based on dedicated hash functions. In addition, some time ago, work was begun in international forums to standardize MACs with so-called universal hash functions, see ISO/IEC 9797-3. However, these are not yet widespread.

In the following, keyed hash functions—HMAC are explained. Among the keyed hash functions, the HMAC construction, see "Mihir Bellare, Ran Canetti and Hugo Krawczyk, Keying hash functions for message authentication, in Neal Koblitz, editor, Proceedings of CRYPTO '96, volume 1109 of Lecture Notes in Computer Science, pages 1-15, Springer, 1996", has become mostly widely used. In particular, it is used very often in the IETF environment, for example in the case of IPsec and http-digest. HMAC is based on the twice-performed, nested hashing of a message x, using a secret key K with a suitable hash function H.

$HMAC_K(x)$: =H(K ⊕ opad∥H(K ⊕ ipad∥x))

The two strings ipad, inner-padding, and opad, outer-padding, are predefined string constants. In contrast to MACs based on block ciphers, there are not a multitude of padding methods and optional processes in the case of the HMAC construction.

In widespread use are, for example, HMAC-SHA-1, H=SHA-1, m=96, that is, only 96 most significant bits of the 160-bit output, and HMAC-SHA-256, H=SHA-256, m=96, that is, only 96 most significant bits of the 256-bit output, see, for example, IPSec. HMAC was considered in the context of safeguarding a sensor, but it is considerably more costly than the solution ultimately proposed in the specific exemplary embodiment.

In the following, MACs based on block ciphers are explained. Let $x_1, x_2, \ldots x_t$ be the blocks of message texts, for example of block length n=128 for the algorithm Enc=AES or of block length n=64 for the algorithms Enc=DES, Triple DES, IDEA or PRESENT, i.e.:

$n=|x_1|=\ldots=|x_{t'-1}|$ t' denotes the number of blocks before the so-called padding; in this case, the last block may, where appropriate, include fewer than n bits, that is, $0<|x_{t'}|\le n$. After the padding, t message text blocks are obtained, the following applying depending on the padding method:

Padding Method 1: the plaintext is padded with no or a plurality of 0-bits until a multiple of block length n is reached, that is, t=t'. For this, see "A. J. Menezes, P. C. van Oorschot, and S. A. Vanstone, Handbook of Applied Cryptography, CRC Press, 1996, Algorithm 9.29, page 334".

Padding Method 2: a 1-bit is appended to the plaintext; after that, padding with 0-bits is carried out until a multiple of block length n is reached, that is, t=t' or t=t'+1. For this, see "A. J. Menezes, P. C. van Oorschot, and S. A. Vanstone, Handbook of Applied Cryptography, CRC Press, 1996, Algorithm 9.30, pages 334-335".

Padding Method 3: encode the length of the original message in a length block L, usually 64 bit, pad with 0-bits, where applicable left-justified. Pad the original message with no or a plurality of 0-bits until a multiple of block length n is reached; append length block L, that is, t=t' or t=t'+1.

Padding Method 3 was first added in the 1999 version, see "ISO/IEC 9797-1, Information technology—Security techniques—Message Authentication Codes (MACs) Part 1: Mechanisms using a block cipher, ISO/IEC, 1999" of the Standard for Message Authentication Codes, and was not in previous versions, see "ISO/IPC 9797, Information technology—Security techniques—Data integrity mechanisms using a cryptographic check function employing block cipher algorithm, ISO/IEC, 1994". This padding method also finds application in the case of hash functions.

The first padding method has poorer security properties than methods 2 and 3.

For simplicity, it is assumed that those message text data already include additional randomization data, which are used to repel so-called replay attacks; more on this is given hereinafter.

Thus, let $x_1, \ldots, x_t$ be the pressure values, message text, padded and, where applicable, supplemented by randomization data. In the specific exemplary embodiment of safeguarding an RP sensor, for example, the following is specifically planned at present:

$Enc_K$—encryption algorithm AES with key K k—length of key K in bits, here k=128 n—block width of the encryption algorithm, here n=128 t—number of blocks, here t=16

In the case of the message authentication codes based on block ciphers, the CBC MAC construction is the most widespread. Let IV be an initialization vector of length n. In contrast to CBC-encryption, in the case of the CBC MAC it is possible to select the value $IV=0^n$.

$H_0:=IV=0^n$ initialization $H_i:=Enc_K(H_{i-1}\oplus x_i)$ i=1, ..., t CBC mode $MAC_K(x):=g(H_t)$ output transformation In the following, it should be noted that: (i) in Appendix A of the standard "ISO/IPC 9797, Information technology—Security techniques—Data integrity mechanisms using a cryptographic check function employing block cipher algorithm, ISO/IEC, 1994", two optional processes are also defined:

optional process 1: in the case of the first optional process, the last block $H_t$ is treated again separately with a second independent key $K_2$: the last block $H_t$ is decrypted with $K_2$ and encrypted with $K_1$. This corresponds to $g(H_t):=Enc_{K1}(Dec_{K2}(H_t))$. This process is called MAC-strengthening, and is used to repel specific chosen-text existential forgery attacks.

optional process 2: the second optional process includes encryption of the last block a second time with the aid of a second key $K_2$, that is, $MAC:=g(H_t)=Enc_{K2}(H_t)$.

(ii) the new standard, see "ISO/IEC 9797-1, Information technology—Security techniques—Message Authentication Codes (MACs) Part 1: Mechanisms using a block cipher, ISO/IEC, 1999", no longer contains optional processes, but instead specifies six different MAC algorithms each of which may be combined with the three different padding methods. The MAC algorithms 4 through 5 are new schemes. On the basis of new cryptanalytical insights of 2003, two of the methods proposed there are no longer to be regarded as suitable. The old, proven algorithms are:

1. CBC MAC without optional processes: ordinary CBC MAC, that is, $g(H_t)=H_t$.

Bellare, Kilian and Rogaway, see "M. Bellare, J. Kilian, and F. Rogaway, The security of cipher block chaining, Journal of Computer and System Sciences, 3(61):362-399, 2000", were able to show in the year 2000 that this CBC MAC is secure in the case of messages of fixed length if the underlying block cipher is secure, that is to say, is a pseudo random function. It will be noted that there will immediately be attacks in the case of messages of variable length, for example $MAC_K(x\|(x \oplus MAC_K(x)))=MAC_K(x)$. For that reason, this simple CBC MAC is not used in practice.

2. CBC MAC with optional process 1: Retail-MAC. This MAC, where $g(H_t)=msb_{63 \ldots 32} Enc_{K1}(Dec_{K2}(H_t))$, was used for the first time for DES in the retail banking sector, hence the name, that is to say, m=n/2=32, n=64, Enc-DES, k=56 for $K_1$ and $K_2$. The modification of the CBC MAC such that it is not the complete last n-bit block $g(H_t)$ that is used as MAC, but only the m left-justified bits thereof, is used for security against exhaustive key attacks. Often, m=n/2 in practice. The use of this CBC MAC method for the integrity of sensor data was first proposed in the RP sensor workshop on Oct. 29, 2008. If DES is employed as encryption algorithm, it makes no great difference in implementation expenditure, both in software and in hardware, whether one uses only encryption or encryption and decryption. In the case of AES, however, the overhead for a decryption is considerably greater compared with an encryption. Therefore, in subsequent sessions, the following method was proposed, which manages with only encryption.

3. CBC MAC with optional process 2: EMAC: this scheme uses as output transformation: $g(H_t)=Enc_{K2}(H_t)=Enc_{K2}(Enc_{K1}(H_{t-1} \oplus x_t))$ with a second key $K_2$. The EMAC-construction was first proposed by the RIPE consortium in the year 1995. With this scheme, Petrank/Rackoff, see "E. Petrank and C. Rackoff, CBC MAC for real-time data sources, Journal of Cryptology, 3(13):315-338, 2000", succeeded for the first time in proving the security of CBC MACs in the case of variable-length inputs. This scheme is proposed as a realization option for safeguarding a sensor, specifically Enc-AES, k=128 for keys $K_1$ and $K_2$, n=128, m=m/2=54.

(iii) A further optimization by Black and Rogaway reduces the overhead due to the padding. The XCBC or Three-Key MAC, see "J. Black and P. Rogaway, CBC MACs for arbitrary-length messages, in Mihir Bellare, editor, Advances in Cryptology—CRYPTO 2000, number 1880 in Lecture Notes in Computer Science, pages 197-215, Springer-Verlag, 2000", uses one k-bit key $K_1$ for the block cipher and two n-bit keys $K_2$ and $K_3$ for the so-called key whitening, see "T. Schütze, Algorithmen für eine Crypto-Library für Embedded Systems [Algorithms for a Crypto-Library for Embedded Systems], Technical report, Robert Bosch GmbH, CR/AEA, August 2007, internal document, version 1.0, 2007-08-07, 46 pages" for the basic idea of the XOR-Encrypt-XOR approach. The XCBC MAC modifies the last encryption and the padding in such a way that the number of blocks before and after padding is the same, that is, t=t':

If $|x_t|=n$, then $x_t=x_t, \oplus K_2$.

If not, append one '1'-bit and j=n-$|x_t|$-1 '0'-bits and $x_t=(x_t|10^j) \oplus K_3$.

(iv) Naturally, yet another key $K_3$ is less advantageous. The OMAC algorithm of Iwata and Kurosawa, see "T. Iwata and K. Kurosawa. OMAC: One key CBC MAC, in T. Johannson, editor, Fast Software Encryption, number 2887 in Lecture Notes in Computer Science, pages 129-153, Springer-Verlag, 2003", reduces the outlay to one key by specifically selecting $K_2 =$ '2'$\times \text{Enc}_{K1}(0^n)$ and $K3=$'4'$\times \text{Enc}_{K1}(0^n)$.

It should be mentioned that '2' and '4' are two elements in the Galois field $GF(2^n)$, and that × denotes the multiplication in this field.

It is expected that NIST will standardize that algorithm under the name CMAC. For this, see "Morris Dworkin, Cipher Modes of Operation: The CMAC Mode for Authentication, NIST Special Publication 800-38b, National Institute of Standards and Technology NIST, May 2005", see "http://csrc.nist.gov/publications/nistpubs/800-38b/sp800-38b.pdf, pages 2 and 3".

For the exemplary embodiment, it is proposed to examine that algorithm OMAC or CMAC as message authentication code for safeguarding sensors parallel to the EMAC.

(v) In the case of CBC encryption, all encrypted blocks are, of course, outputted, while in the case of the CBC MAC only the last block is outputted. There are not only technical reasons for this. A CBC MAC method which outputs all $H_t$ is insecure; see "Jonathan Kahtz and Yehuda Lindell, Introduction to Modern Cryptography, CRC Publishing, 2007, page 126".

In the following, the proposed integrity-protection methods are described and summarized. As before, $x=(x_1, \ldots, x_t)$ denotes the blocks of message texts, pressure values, of block length n, Enc={AES, PRESENT} denotes the symmetric block cipher, that is, k=128 and n=128 or n=64. After the padding—padding methods 1 or 2 may be chosen—t message text blocks $x=(x_1, \ldots, x_t)$ are obtained. In order to be able to present actual numbers, the realization currently planned for the RP sensor is selected for the following description:

t=16 blocks
Enc AES, k=128, n=128
padding method 1
In the following, the EMAC is explained:
$H_0 := IV = 0^{128}$ initialization
$H_i := \text{Enc}_{K\ AB,MAC1}(H_{i-1} \oplus x_i)$ i=1, ..., t CBC mode
$MAC_K(x) := msb_{127 \ldots 64}[\text{Enc}_{K\ AB,MAC2}(H)]$ output transformation with the two 128-bit MAC keys $K_{AB,MAC1}$ and $K_{AB,MAC2}$, m=n/2=64, that is, truncation of MAC output, and the output transformation $\text{Enc}_{K\ AB,MAC2}(H_t)$.

In the case of the variant currently under consideration, the number of bits 2048 is divisible by the block length 128, that is, padding method 1 is equivalent to no padding. For general applications of this security concept, padding method 2 is strongly recommended; otherwise, the method should really only be used for fixed-length input. The security proof for the EMAC method is to be found in "E. Petrank and C. Rackoff, CBC MAC for real-time data sources, Journal of Cryptology, 3(13):315-338, 2000", that is, existentially unforgeable under adaptive chosen-message attacks for variable input length. The method is standardized in "ISO/IEC 9797-2, Information technology—Security techniques—Message Authentication Codes MACs—Part 2: Mechanisms using a dedicated hash function, ISO/IEC; 2002". The outlay essentially consists of t+1 invocations of the block cipher.

In the following, the CMAC/OMAC is considered. Let K or $K_{AB,MAC1}$ be the 128-bit MAC key; $K_1$, $K_2$ denote two 128-bit derived keys. Further, as usual, let $x_1, \ldots, x_{t-1}, x'_t$ be the blocks of message texts of block length n (n=128 for AES). For the CMAC method, t'=t applies, that is, the number of blocks before and after post-processing (padding) of the last block is identical; even $|x_t|=|x'_t|$ applies, that is, the number of bits in the last block is identical; however, $x'_t = x_t$ does not apply. Rather, the last block is modified by the XCBC construction.

In the following, an algorithm for subkey generation in the case of CMAC is explained.

Input: Key K, Output: Subkeys $K_1$, $K_2$

S1: $L := \text{Enc}_K(0^{128})$;

S2: if (msb(L)=0) then $K_1 := (L<<1)$ else $K1 := (L<<1) \oplus R_b$

S3: if (msb($K_1$)=0) then $K2 := (K1<<1)$ else $K_2 := (K_1 <<1) \oplus Rb$;

The constant $R_b := 0x0 \ldots 087$ for a block cipher of block width 128, that is, for example, AES, and $R_B := 0x0 \ldots 01B$ for a 64-bit block-length cipher, for example Triple DES. If $|x'_t| = n$, that is, the last block $x'_t$ is complete, then set $xt := K_1 \oplus x'_t$, else $xt := K_2 \oplus (x'_t | 10^j)$ where $j = n - |x'_t| - 1$. With these message blocks $x_1, \ldots, x_t$, which have been altered only in the last block compared with the original data, the standard CBC MAC algorithm is then carried out; if required, the output may be truncated except for 64 bits:

$H_0 := IV = 0^{128}$ initialization $H_i := \text{Enc}_{K\ AB,MAC1}(H_{i-1} \oplus x_i)$ i=1, ..., t CBC mode $MAC_K(x) := msb_{127 \ldots 64}(H_t)$ output transformation In the case of the CMAC method, in contrast to the EMAC, even with a number of bits that is not divisible by the block length it is not necessary for a block to be additionally appended. Only one 128-bit MAC key $K_{AB,MAC1}$ is needed. For description and security of the method, reference is made to "T. Iwata and K. Kurosawa, OMAC: One key CBC MAC, in T. Johannson, editor, Fast Software Encryption, number 2887 in Lecture Notes in Computer Science, pages 129-153, Springer-Verlag, 2003" and "Morris Dworkin, Cipher Modes of Operation: The CMAC Mode for Authentication, NIST Special Publication 800-38b, National Institute of Standards and Technology (NIST), May 2005", see also "http://csrc.nist.gov/publications/nistpubs/800-38b/sp800-38b.pdf". The method is currently being standardized at the NIST. The outlay consists of t invocations of the block cipher, a one-time precalculation of $\text{Enc}_K('0')$, and also the $GF(2^{128})$ or shift operations.

Whether it is really possible in practice to realize the CMAC method faster and, above all, in a way that saves more space or, rather, more memory space, than EMAC is entirely dependent on the implementation of the block cipher and the combinatory overhead in the case of CMAC. It will only be possible to announce details after various implementation tests. The MAC calculation and verification takes place substantially identically on sensor side (A) and control unit side (B).

Figure 5:
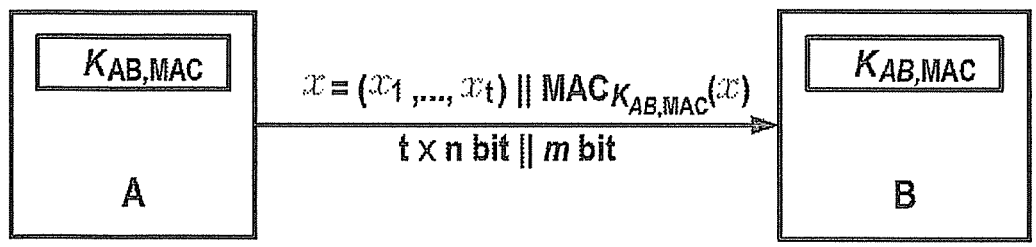
FIG. 5 shows a schematic representation to explain protection of the integrity of sensor data by EMAC or CMAC message authentication codes.

FIG. 5 shows a schematic representation to explain an integrity protection of the sensor data by message authentication codes EMAC or CMAC:

A: calculate 64-bit MAC value using shared keys K = $K_{AB,MAC}$, either $K_{AB,MAC}=K_{AB,MAC1}$, $K_{AB,MAC2}$ in the case of EMAC or only $K_{AB, MAC}=K_{AB, MAC1}$ in the case of CMAC, from the t input blocks $x=(x_1, \ldots, x_t)$ each of length n:

$$MAC_K(x) := \begin{cases} EMAC_K(x) \\ CMAC_K(x) \end{cases}$$

Send MAC value together with the message texts $x=(x_1, \ldots, x_t)$ to B

A→B: $x_1, \ldots, x_t$, $MAC_K(x)$ t×n bits, m bits=2048 bits, 64 bits

B: receives message texts in plaintext, is able to forward them immediately for further processing without latency delay and for its part calculates $MAC_K(x)$ and finally compares with the transmitted MAC value of A. In the case of non-identity, an error signal is generated, which is to be suitably handled.

In the following, as a further part of the overall security concept a method for preventing replay attacks is described. Since a message authentication code should always be independent of the semantics of the data, for good reason no time-dependent state is incorporated in the construction of MACs. If, therefore, the data $x=(x_1, \ldots, x_t)$ in the above protocol were only pure pressure data, then an attacker/tuner would be able to record engine situations or pressure characteristics (full throttle) of interest to him, and replay them later. In order to prevent that scenario, in addition to the data, random elements (random numbers, time-variant parameters) are inserted into the contents of the message, that is to say, the integrity-protection method, the MAC, itself remains unchanged. In view of efficiency considerations and estimations of the possibilities for a local database with recorded pressure data, it is proposed, for example, to insert at least r=32 bits of random data $R_A$ into each t×n=16×128=2048-bit block. From a cryptography perspective, even r=48 bits of random data would be advisable where necessary.

Since it is to be assumed that the actual pressure data transmitted will also have a certain entropy, this compromise is pursued further in the following. The actual distribution, that is, at what position pressure data occur and when random bits occur, is cryptographically insignificant. The proposal for the RP sensor exemplary embodiment is as follows: 9 bits pressure data x 224+r=32 bits random numbers $(R_A)$=2048=128×16=t×n. Using that, replay attacks are effectively prevented in the integrity protection. An attacker would have to completely record at least $2^{32+Entropy(x)}$ protocol runs.

In the following, it is demonstrated how, in the decisive fourth step of the security concept according to the present invention, a so-called transaction authentication is obtained by skillful linking of the two methods. What is needed for safeguarding a sensor is more than a pure message authentication, namely uniqueness and freshness as well. Reference is made to "A. J. Menezes, P. C. van Oorschot, and S. A. Vanstone, Handbook of Applied Cryptography, CRC Press, 1996, Table 9.10, page 362". The table of types of authentication given in that literature reference appears as follows:

| | Identification of Source | Data integrity | Timeliness or uniqueness | Defined in |
|---|---|---|---|---|
| Message auth. | Yes | Yes | — | §9.6.1 |
| Transaction auth. | Yes | Yes | Yes | §9.6.1 |
| Entity auth. | Yes | — | Yes | §10.1.1 |
| Key auth. | Yes | Yes | Desirable | §12.2.1 |

With the MAC for integrity security (first row), no freshness is achieved. For that purpose, the authentication is used, penultimate row here and called Entity Authentication. It will be seen here that a Transaction Authentication would be the best. However, that requires Message Authentication and correspondingly long time-variant parameters in each packet; that is, for example, a MAC regarding the pressure data and a sufficiently long time stamp or a (synchronized) counter. Since there is neither a clock nor a synchronous counter as standard on the sensor, the combination of row 3 (entity authentication) and row 1 (message authentication, integrity protection) was therefore selected.

At this point comes the decisive linking of the two protocols. In the authentication procedure, control unit B sends, for example, a random number $R_E$ to sensor A. In the integrity protection procedure, the sensor sends a random number $R_A$ to the control unit. In German patent application document DE 102009002396, the 32 least significant bits of $R_B$ are used for $R_A$ at the beginning, and in each step, that is, every t×n=2048 bits, the value of $R_A$ is incremented by one. In that manner, the two protocols are securely linked cryptographically. Knowledge of the lsb($R_B$) used as sequence counter is of no use to an attacker, since it is, after all, selected anew by the control unit upon each authentication. Furthermore, the implementation of a random number generator on sensor side A is unnecessary, since all the random numbers come from control unit B. However, these days, there are already deterministic RNGs on control units.

An important question for such an implementation is, then, how often is it possible to perform the integrity protection protocol step without a repetition of sequence counter $R_A$ occurring. It is assumed that the 32-bit counter simply overflows (unsigned int wrap), that is to say, it is possible to transmit $2^{32} \times (2048-32)$ bits of pressure data. At a data transfer rate of 8000×9 bits per second, a repetition of the counter occurs after $$\frac{2^{32} \times (2^{10} - 2^5)}{8000 \times 9 s^{-1}} \approx 5.9 \times 10^7 s \approx 684 \text{ days}$$

A re-authentication should be carried out after this time at the latest. Control unit B does, of course, itself send random number $R_B$ to the sensor, and therefore it is also able to calculate the start value for the sequence counter $R_A = lsb_{31 \ldots 0}(R_B)$. With each data packet, that is, every t×n bits, the control unit receives a new value $R'_A$. If the transmitted value $R'_A$ is within a certain window of $[R_A, R_A+\Delta R_A]$, for example $\Delta R_A:=3$, then the control unit accepts that sequence counter and sets $R_A:=R'_A+1$. It is important that the sensor is not able to reset the sequence counter of its own accord, see poor design solution in the case of KeeLoq. Normally, that is, without packet losses, $\Delta R_A:=0$ should be sufficient, that is to say, $R_A$ is incremented by only one with each packet.

At this point, it is expressly pointed out that a transaction authentication, that is, integrity of the sender, integrity of the data, and the freshness, may be achieved either with a bidirectional communication protocol (challenge-response) or with a global, independent time stamp or sequence counter. The claimant/prover, in this case the sensor, must not be capable of resetting the counter or the clock. That may lead to denial-of-service attacks, as in the case of KeeLoq. The counter is accepted only in a specific validity window, and the attacker manipulates the counter in such a way that it is always invalid. Consequently, the sensor is not accepted or must be re-trained. In the case of vehicle immobilization systems it is assumed that the vehicle key being authenticated is itself tamper-resistant, and in that way it is not possible for unnatural counters to be generated. Should the internal counter of a vehicle key deviate by several 100000 from the last authorized counter, then usually the vehicle key has to be reprogrammed.

While the linking of authentication of the sensor and integrity protection of the sensor data in accordance with German patent application document DE 102009002396 thus produces an increased security of the overall concept, a further set of problems is still unsolved. Loss of a secret key due to side channel attacks (SCAs), such as, for example, differential power analysis (DPA), cannot be ruled out. The following question may therefore be derived from the construction described thus far: how do the desired properties of the overall protocol behave if part of the secret information becomes known (in this case loss of a key Kauth or Kmac), for example as a result of side channel attacks? In the protocol proposed heretofore, such a breach of a constituent protocol leads to breach of the overall protocol. For the security concept presented heretofore, a so-called session splitting attack would be possible, which is an attack that undermines the entire security concept by exploiting the breach of one of the secret keys. In such an attack, the attacker is able, for example after breach of the integrity protection (Kmac known), to split the transaction (i.e. the session): he calculates the values for the integrity protection himself for data of his choosing (since Kmac is known) and uses the original source to successfully negotiate the challenge-response protocol.

SCAs would be made more difficult, for example, by increasing the minimum permissible time between the running of two constituent protocols. This results in a reduction in the possible sample rate during the attack and hence increases the time taken for a successful attack. While the required data rate places narrow limits on an increase in that minimum period of time in the case of the constituent protocol integrity protection, in the case of authentication a very much higher value may be used.

The concept described in the following constitutes an effective and efficient measure against breach of the overall protocol in the event of successful session splitting attacks (e.g. SCA attacks) on a constituent protocol. As a modification of the protocol described previously, it is proposed that the two constituent protocols be linked to each other in such a way that, for example, knowledge of Kmac (for example as a result of SCA, which is more difficult to prevent here than in the case of the other constituent protocol) does not entail a breach of the overall protocol. The proposed modification retains the positive properties of the original protocol with regard to resources and security. The basis for the proposed variant is the secure derivation of a secret value from the challenge and from $K_{auth}$. That value then serves as initial value $R_{a0}$ of the nonce (number used only once) $R_a$ which is included in every MAC calculation. In the original protocol (German patent application document DE 102009002396), that initial value is formed directly from the challenge, a value which is known by the attacker.

Figure 6A:
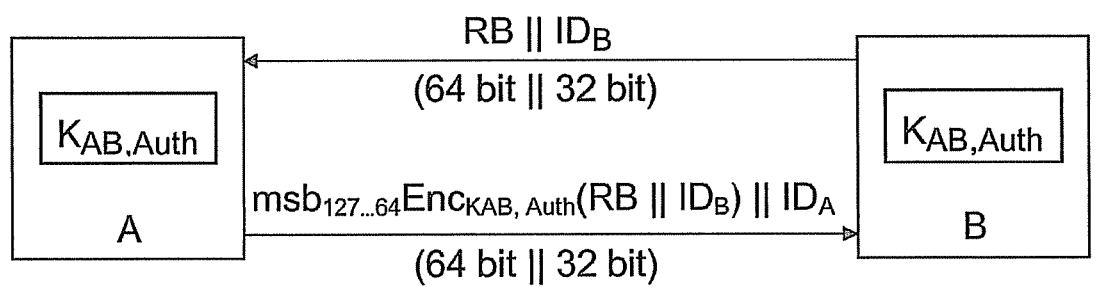
FIGS. 6A and 6B show a schematic representation of an example of an overall protocol to explain the linking according to the present invention of authentication and integrity protection, or authentication and transaction authentication, for transaction security of the sensor data.
Figure 6B:
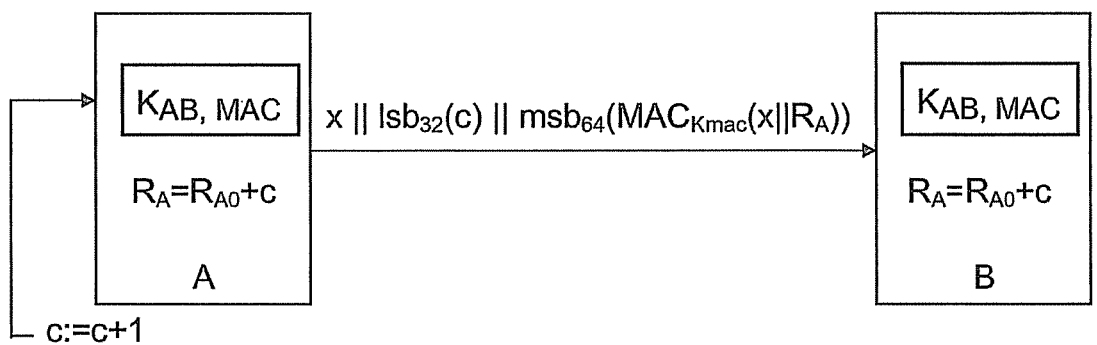

FIG. 6, or rather FIGS. 6a and 6b, show(s) a schematic representation to illustrate an overall protocol of a linking of integrity protection and authentication for transaction security of sensor data in the new proposed variant. The communication of sensor A with control unit B is shown therein. The sensor data of sensor A to control unit B are denoted by x. Sensor A and control unit B have a shared key $K_{AB,Auth}$, for example a 128-bit AES key, for the authentication, and a shared key $K_{AB,MAC}$, for example again a 128-bit AES key, for the message authentication code CMAC (in the alternative case of the message authentication code EMAC, it would be two keys $K_{AB,MAC1}$ and $K_{AB,MAC2}$).

FIG. 6a shows first steps of the overall security concept, more specifically the description of a challenge-response method. In a first step, control unit B generates a cryptographically secure 64-bit random number $R_B$ and sends it, concatenated with identity $ID_B$, to sensor A: $B \rightarrow A: R_B \| ID_B$.

Sensor A encrypts the received data packet ($R_B \| ID_B$) with a symmetric AES key $K_{AB,Auth}$. Of the resulting $Enc_{K_{AB,Auth}}$ ($R_B \| ID_B$) of 128-bits length, the 64 msb (most significant bits) are taken and are sent back, together with identity $ID_A$, to control unit B: $A \rightarrow B: msb_{127 \ldots 64}[Enc_{K_{AB,Auth}}(R_B \| ID_B)] \| ID_A$.

Immediately after the data $R_B \| ID_B$ have been sent to the sensor, control unit B for its part is able to begin to calculate $msb_{127 \ldots 64}[Enc_{K_{AB,Auth}}(R_B \| ID_B)]$. It then compares the data received, both $msb_{127 \ldots 64}[Enc_{K_{AB,Auth}}(R_B \| ID_B)]$ and $ID_A$. Only if both values agree in each instance is the protocol continued; the sensor is authenticated with respect to the control unit. In the event that only one value deviates, an error message "authentication of sensor failed" is generated.

FIG. 6b shows the linking of authentication and integrity protection with initial value $R_{a0}$ of nonce (number only used once) $R_a$ being derived from the challenge and from $K_{auth}$.

As will be seen in FIG. 6a, $R_b$ is already encrypted, together with $ID_b$, in the sensor in order to work out the authentication response. As the response in the challenge-response procedure of the authentication there is transmitted res:=$MSB_{64}$ (Enc Kauth (Rb∥IDb)); the last 8 bytes are kept secret by truncation. The initial $R_a$ ($R_{a0}$) is then derived from $Enc_{K_{AB,Auth}} R_B \| ID_B$), for example as $LSB_{64}$ (Enc $K_{auth}$ ($R_b \| ID_b$), that is to say, for example, the part of Enc $K_{auth}$ ($R_b \| ID_b$) that was truncated in the challenge-response (instead of a part of $R_b$ as in German patent application document DE 102009002396) is used as $R_a$. The sensor therefore stores, for example as shown in FIG. 6b, the 64 least significant bits (lsb) of $Enc_{K_{AB,Auth}}(R_B \| ID_B) \| ID_A$ as $R_A$, or as initial value $R_{a0}$ of nonce $R_A$.

For reasons of efficiency, therefore, an already calculated part from the challenge-response procedure of the authentication, for example the part that was not sent (response truncation), is used as initial value $R_{a0}$. The sensor data are, as described, denoted by x. In the following, various possibilities may be employed for calculating a message authentication code, for example EMAC or CMAC, as described above. Sensor data x, concatenated with time-variant parameters, are sent to the control unit together with the $msb_{64}$ of the message authentication code $MAC_{KMac}$, see FIG. 6b. In the original protocol, the time-variant parameters, or the current nonce, are transmitted unencrypted. In the modified protocol proposed herein, however, that is no longer possible since that would weaken the response truncation of the authentication. So as not to weaken the response truncation, in a preferred embodiment, in addition, instead of $R_a$ the value c is transmitted as unsigned integer with overflow, where c:=$R_a - R_{a0}$, and $R_a$ continues to be used in the MAC calculation, see FIG. 6b: A→B: x∥lsb32(c)∥msb64 (MAC$_{Kmac}$(x∥RA)).

Finally, sequence counter $R_A$ is incremented by one.

Control unit B receives sensor data x and processes them and/or forwards them. With the received data, on the control unit side for its part the MAC value is calculated and compared with the received MAC value. Since the starting value for c, or $R_A$, is known by the control unit, it is able to check whether the sequence counter c sent is within a predefined interval. If so, it accepts it and performs the above calculations. If not, then sensor A and control unit B have evidently lost too many packets or the synchronism has been lost. A re-authentication should then take place, inter alia in order to re-negotiate c, or $R_a$. After the MAC calculation and comparison, c, or $R_A$, is incremented by one.

Expressed in more general terms, for calculation of the time-variant parameters used in the course of the transaction authentication, or the sensor data integrity protection, at least a second part of the cryptographic authentication message is utilized and, for calculation of the cryptographic integrity protection, at least a third part of the cryptographic authentication message is utilized, whereas in the course of the sensor authentication, a first part of the cryptographic authentication message MSB$_{64}$ Enc$_{KAB,Auth}$(RB∥ID$_B$) was sent. In the example shown in FIG. 6, LSB$_{64}$ Enc$_{KAB, Auth}$(RB∥ID$_B$) corresponds to the second and third parts. The second and third parts do not, however, need to be identical in this case. It may be advantageous if the first part does not overlap with the second and third parts or, at least, is not identical to the second and third parts. The second and third parts may be identical, may overlap or may be separate parts of Enc$_{KAB,Auth}$ (RB∥ID$_B$).

The current parameter $R_a$ is calculated in every sensor data transaction; the time-variant parameters c correspond in every sensor data transaction to the difference between the initial value $R_{a0}$, that is, in the example, LSB$_{64\ EncKAB,Auth}$ (RB∥ID$_B$), and the current parameter of the previous sensor data transaction.

There are alternatives to the above-described exemplary embodiment of the overall security concept according to the present invention.

In each step of the transaction authentication, $R_A$ is incremented by 1 in the exemplary embodiment described above. Other incrementations or other changes according to fixed rules are also conceivable for this, and may be advantageous. The (cryptographic) methods preferred here for authentication and for integrity protection, or for transaction authentication, are also merely by way of example and may also be replaced by other, alternative methods mentioned in the description or by comparable methods not mentioned.

Number $R_B$ has been referred to as a random number in the above-described concept. More generally, it may also be provided as a nonce (number only used once), for example besides random number also as a time stamp or sequence counter.

What is claimed is:

1. A method for protecting a sensor from manipulation of sensor data, comprising:
   sending, in the context of an authentication of the sensor, a number used once from a control unit to the sensor;
   generating by the sensor with the use of the number used once a cryptographic authentication message;
   sending at least a first part of the cryptographic authentication message to the control unit;
   providing sensor data with a cryptographic integrity protection, wherein at least a third part of the cryptographic authentication message is utilized for calculation of the cryptographic integrity protection;
   adding time-variant parameters to the sensor data, wherein at least a second part of the cryptographic authentication message is utilized for calculation of the time-variant parameters; and
   sending the sensor data with the cryptographic integrity protection and the added time-variant parameters from the sensor to the control unit.

2. The method as recited in claim 1, wherein the time-variant parameters are altered for each sensor data transaction between the sensor and the control unit.

3. The method as recited in claim 2, wherein the alteration of the time-variant parameters is a stepwise incrementation.

4. The method as recited in claim 2, wherein a current parameter is calculated from the second part of the cryptographic authentication message in each sensor data transaction, and the time-variant parameters for an n-th sensor data transaction are calculated from a difference between the current parameter and the second part of the cryptographic authentication message.

5. The method as recited in claim 4, wherein the current parameter is utilized for the calculation of the cryptographic integrity protection.

6. The method as recited in claim 4, wherein the authentication of the sensor is carried out in accordance with a challenge-response method.

7. The method as recited in claim 4, wherein the cryptographic integrity protection of the sensor data is carried out in accordance with a message authentication code method.

8. The method as recited in claim 7, wherein an OMAC method or an EMAC method is used as the message authentication code method.

9. The method as recited in claim 2, wherein the time-variant parameters are altered by one of time stamps, sequence counters, or random numbers.

10. The method as recited in claim 4, wherein the first part of the cryptographic authentication message and the second part of the cryptographic authentication message do not overlap, and wherein the first part of the cryptographic authentication message and the third part of the cryptographic authentication message do not overlap.

11. A sensor, comprising:
   an interface for receiving a number used once from a control unit; and
   a processing unit configured to control:
      generating by the sensor with the use of the number used once a cryptographic authentication message;
      sending at least a first part of the cryptographic authentication message to the control unit;
      providing sensor data with a cryptographic integrity protection, wherein at least a third part of the cryptographic authentication message is utilized for calculation of the cryptographic integrity protection;
      adding time-variant parameters to the sensor data, wherein at least a second part of the cryptographic authentication message is utilized for calculation of the time-variant parameters; and
      sending the sensor data with the cryptographic integrity protection and the added time-variant parameters from the sensor to the control unit.

12. The sensor as recited in claim 11, wherein the processing unit is further configured to alter the time-variant parameters in each sensor data transaction between the sensor and the control unit.

13. The sensor as recited in claim 12, wherein the alteration of the time-variant parameters is a stepwise incrementation.

14. The sensor as recited in claim 12, wherein the processing unit calculates: i) a current parameter from the second part of the cryptographic authentication message in each sensor data transaction; and ii) the time-variant parameters for an n-th sensor data transaction from a difference between the current parameter and the second part of the cryptographic authentication message.

15. A control unit, comprising:
- a processing unit configured for generating and sending a number used once to a sensor; and
- an interface for receiving from the sensor, in the context of an authentication of the sensor, at least a first part of a cryptographic authentication message generated with the use of the number used once;
- wherein the processing unit is further configured for:
    - generating a cryptographic comparison authentication message;
    - evaluating, in the context of the authentication of the sensor, the received first part of the cryptographic authentication message with the aid of the cryptographic comparison authentication message; and
- evaluating sensor data provided with a cryptographic integrity protection and time-variant parameters, wherein at least a second part of the cryptographic comparison authentication message is used for evaluation of the time-variant parameters, and wherein at least a third part of the cryptographic comparison authentication message is used for evaluation of the cryptographic integrity protection.

* * * * *